Sept. 10, 1946.  D. B. PARKINSON  2,407,325
RANGE CONVERTER
Filed April 23, 1942  2 Sheets-Sheet 1

INVENTOR
D. B. PARKINSON
BY
ATTORNEY

Sept. 10, 1946.   D. B. PARKINSON   2,407,325
RANGE CONVERTER
Filed April 23, 1942   2 Sheets-Sheet 2
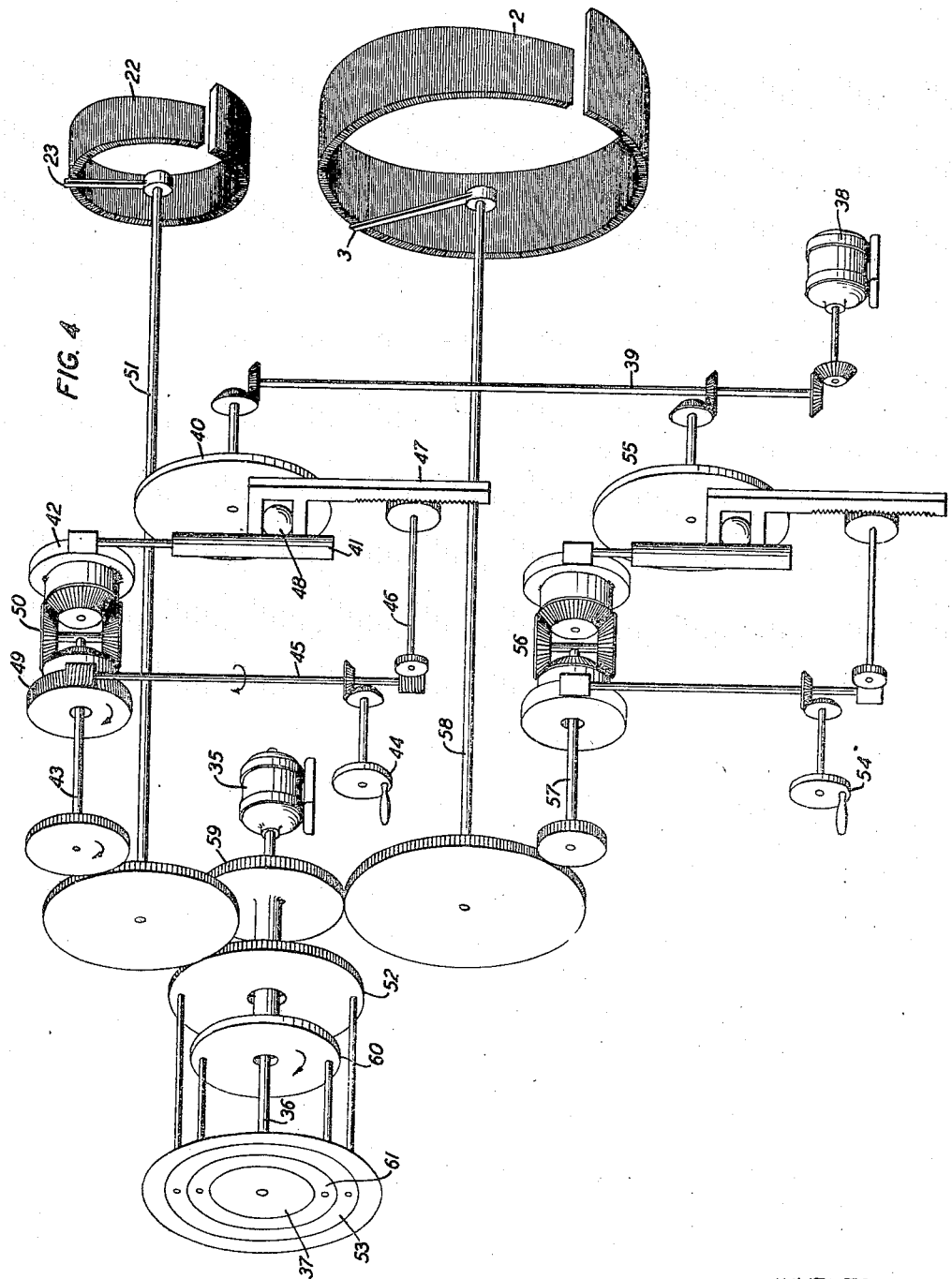
INVENTOR
D. B. PARKINSON
BY
E. V. Griggs
ATTORNEY Patented Sept. 10, 1946

2,407,325

UNITED STATES PATENT OFFICE 2,407,325

RANGE CONVERTER

David B. Parkinson, Maplewood, N. J., assignor to Bell Telephone Laboratories, Incorporated, New York, N. Y., a corporation of New York Application April 23, 1942, Serial No. 440,166

1 Claim. (Cl. 235—61.5)

This invention relates to electrical computing systems and particularly to artillery computers.

The object of the invention is to convert electrical data representing one side of a right triangle into electrical data representing another side of the same triangle.

A feature of the invention is an electrical computing system adjusted to produce an electrical quantity approximately representing one side of a right triangle, to convert this quantity into another quantity approximately representing another side of the same triangle, to compare this latter quality with a quantity accurately representing the other side of the triangle, so that the first quantity may be readjusted to reduce the error shown by the comparison to zero, when the first quantity accurately represents the side of the triangle.

Another feature of the invention is a mechanical system for conveniently indicating and adjusting the magnitudes of the quantities.

A further feature of the invention is an electrical device for conveniently indicating inequality between the electrical quantities being compared.

Many computing systems, such as anti-aircraft artillery directors, must be supplied with a quantity which is proportional to the hypotenuse of a right triangle, that is, for example, the slant range to the target. In many cases, it may be more convenient to measure another side and an angle of the triangle. Just before a bomb is released, the aircraft frequently fly at constant height, and this vertical height may be accurately measured. At the same time, the changing angle of elevation is also observed. In a system in accordance with the present invention, the data relating to the vertical height and angle of elevation of a target is continually received and converted into an indication of the slant range. Though the invention is of peculiar utility in connection with the direction of anti-aircraft fire, it is not limited to this use, but may be used in connection with the solution of any right triangle.

Other uses and advantages of the invention will be apparent from the drawings in which:

Fig. 1 schematically shows a computing system embodying the invention;

Fig. 4 diagrammatically shows a mechanism embodying the invention.

Figure 1:
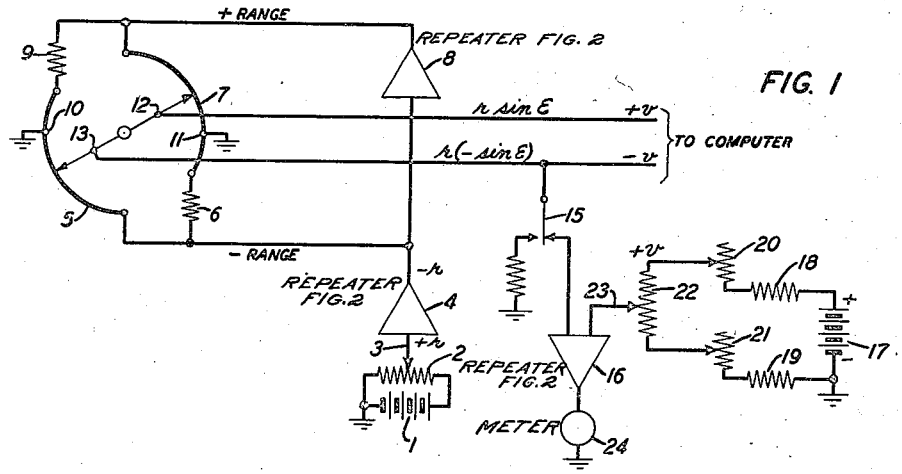

In Fig. 1, a source of voltage 1 is connected to the winding of a potentiometer 2. The wiper 3 of the potentiometer 2 is adjusted so that the potential of the wiper 3 with respect to ground is approximately proportional to the slant range to the target. For convenience of description, single lines have been shown representing one side of the circuits, the return side being through a common ground.

Figure 2:
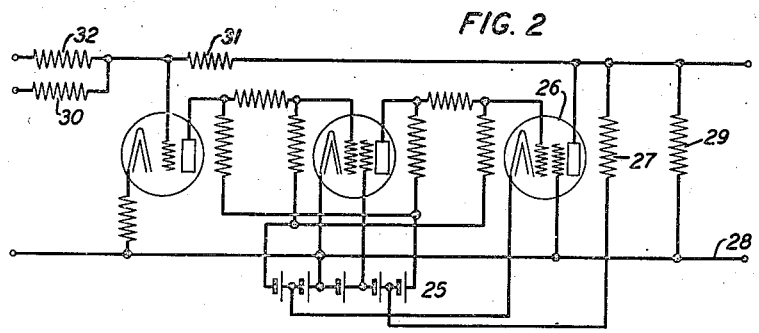
Fig. 2 shows a summing repeater used in the system.

The positive polarity of the wiper 3 is reversed in the repeater 4, of the type shown in Fig. 2, which also serves to electrically isolate the wiper 3, so that changes in the remainder of the circuit will not change the voltage selected by the wiper 3.

The negative voltage from the output of the repeater 4 is supplied to one end of the winding 5, and through resistor 6 to one end of the winding 7.

The negative voltage from the repeater 4 is reversed in polarity by the repeater 8, the positive voltage from the output of the repeater 8 being applied to the other end of the winding 7 and through resistor 9 to the other end of the winding 5. The windings 5 and 7 are respectively grounded at the points 10 and 11.

The angle of elevation of an airplane cannot exceed ninety degrees above the horizon, and will rarely be more than ten or twenty degrees below the horizon. The windings 5 and 7 thus may extend over a full quadrant, and ten or twenty degrees more. The windings 5 and 7 have a resistance per unit length varying with a cosinusoidal function throughout the full quadrant, and the excess of some ten or twenty degrees. The resistors 6 and 9 have a resistance which added to the resistance of the excess equals the resistance of the quadrant, thus equalizing the currents in the windings 5 and 7 from the repeater 4 and from the repeater 8.

A sinusoidal function is positive in the first quadrant and negative in the fourth quadrant. Thus, assuming zero angle at the point 11 and counter-clockwise rotation for increasing angle, the potential of the wiper 12 will be positive in the first quadrant, and negative for the excess in the fourth quadrant, and this is the variation of a positive sine function. The potential of the wiper 13 with respect to ground will be negative in the first quadrant, and positive for the excess in the fourth quadrant, and this is the variation of a negative sine function.

The wipers 12 and 13 are insulated from each other and from their mounting. The wipers 12 and 13 are connected to the rest of the circuit by any suitable means such as slip rings or flexible connectors.

Figure 3:
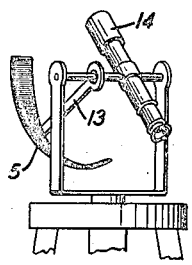
Fig. 3 shows an observing telescope.

The wipers 12, 13 are rotated through the angle of elevation of the target, or the angle of the triangle. This rotation may be obtained in any desired manner. One typical method is shown in Fig. 3, in which a spotting telescope 14 is continually directed at the target. The wiper 13 is driven by the shaft of the telescope 14, either directly or through suitable gearing. The winding 5 and wiper 13 are supported in any desired manner by the telescope tripod, and are insulated therefrom. The winding 7 and wiper 13 may be similarly associated with the telescope 14.

As the voltage applied to the windings 5 and 7 is approximately proportional to the slant range to the target or the hypotenuse of the right triangle, the potential of the wiper 12 will be proportional to the slant range times the positive sine of the angle of elevation, that is, the positive vertical height, and this may be supplied to the computer. Similarly, the potential of the wiper 13 with respect to ground is approximately proportional to the slant range times the negative sine of the angle of elevation, that is, the negative of the vertical height. The potential with respect to ground of the wiper 13 is supplied through the break contact of the key 15 to the summing repeater 16 of the type shown in Fig. 2.

Current from a source 17, which may be the source 1 or a separate source, flows through resistors 18, 20, the winding of potentiometer 22, resistors 21, 19 back to the source. The resistors 18, 19, 20, 21 fix the potential of the winding 22 at any desired value above ground. The vertical range measuring device may be located in a position which has a different altitude than the battery, thus the vertical range as read by the device must be corrected before being used in the computer. The variable resistors 20, 21 are adjusted to fix the potential of the winding 22 with respect to ground at a value proportional to the difference in altitude between the measuring device and the gun.

Data giving the vertical height of the target is sent from some suitable observation device, such as known types of optical range finders, to the converter and the wiper 23 is adjusted to make the potential with respect to ground of the wiper 23 accurately proportional to the vertical height. The positive voltage with respect to ground of the wiper 23 is supplied to the summing repeater 16 and there added to the negative voltage with respect to ground of the wiper 13. If these voltages are unequal, a voltage will be produced in the output of the repeater 16 and indicated on the meter 24. The wiper 3 is adjusted to reduce this voltage to zero, making the voltage with respect to ground of the wiper 3 accurately proportional to the slant range to the target.

The repeater 16 and meter 24 may be replaced by any suitable type of differential meter. In cases where the slant range is supplied directly to the operator of potentiometer 2, the key 15 may be operated, cutting off the comparison circuit, and putting a comparable dummy load on the wiper 13.

The repeater shown in Fig. 2 is essentially a three-stage amplifier, having interstage couplings of the type disclosed in United States Patent 1,751,537, March 25, 1930, H. Nyquist, and supplied with suitable potentials by the source 25. The anode of the vacuum tube 26 is connected through the coupling resistor 27 with a positive tap of the source 25, the cathode of the vacuum tube 26 is connected to a negative tap of the source 25, and an intermediate tap of the source 25 is connected to the wire 28, common to the input and output circuits, which may conveniently be grounded. Current can flow from the source 25 through resistor 27, load resistor 29, wire 28 back to the source. Current can also flow from the intermediate tap of the source 25, through load resistor 29, anode-cathode space of vacuum tube 26, to the negative tap of the source 25. By suitable design, these currents may be made equal, so that in the absence of a signal no voltage is developed across the load resistor 29. If a source of voltage is applied through resistor 30 to the input of the repeater, this balance is upset, and a voltage is developed across the resistor 29, which due to the odd number of stages, is opposite in polarity to the applied voltage.

Negative feedback is supplied through resistor 31 from the output to the input of the repeater, of such magnitude that the gain of the repeater is substantially controlled by the feedback, and the input impedance is small.

Thus, if the resistors 30, 31 are of equal resistance, the voltage developed across the resistor 29 will equal the applied voltage. If a second voltage be applied to the input of the repeater through resistor 32, the voltage across the resistor 29 will equal the sum of the voltages applied to the resistors 30, 32 and, as the resistors 30, 32 may have a high resistance compared to the low impedance of the input circuit, there will not be any interaction between the sources supplying the voltages to the resistors 30, 32.

A convenient mechanism for adjusting the potentiometers is shown in Fig. 4. The data from the measurement of vertical height is received by the Selsyn receiver 35 which rotates the shaft 36 and dial 37 to indicate the vertical height.

A suitable power motor 38 drives the shaft 39 which rotates the disc 40 of a known type of disc, ball and roller friction speed adjusting device. The roller 41 rotates the pinion of a worm gear 42 which drives shaft 43. The hand wheel 44 rotates shaft 45 which drives shaft 46. Shaft 46 drives the pinion of a rack and pinion 47, sliding the ball 48 between the disc 40 and roller 41 to adjust the speed of shaft 43. The shaft 45 also drives the pinion of the worm gear 49 which cooperates with the worm gear 42 through the differential 50 in driving shaft 43.

Shaft 43 is geared to shaft 51 and rotates the wiper 23 of the vertical height potentiometer 22, Fig. 1. The shaft 51 drives gear 52, mounted concentrically with shaft 36, which causes the dial annulus 53 to rotate until the annulus 53 exactly coincides with the position of dial 37. The wiper 23 is then accurately set for the correct value of the vertical height.

The shaft 39 also drives through friction speed adjusting device 55 and differential gear 56 the shaft 57. The hand wheel 54 adjusts the speed of shaft 57 in the same manner as the hand wheel 44 adjusts the speed of shaft 43. The shaft 57 drives the shaft 58 rotating the wiper 3 of potentiometer 2, Fig. 1, till the meter 24 indicates zero current.

The shaft 56 also drives gear 59 which is mounted concentrically with the shaft 36 and directly connected with the disc 60. The disc 60 rotates the dial annulus 61 to give a visual reading of the slant range.

In order to make the scales on the dials more uniform and easily read, the windings of the potentiometers 2, 22 may be tapered as shown.

What is claimed is:

In a system for controlling from an observation point, artillery firing at a target, a source of voltage, a potentiometer having a winding and a wiper adjusted to select a voltage proportional to the known height of the target, a pair of resistors respectively connected between the poles of said source and the ends of said winding, said resistors being adjusted to a value proportional to the difference in elevation between said observation point and said artillery, a second source of adjustable voltage, a second potentiometer having a winding varying in resistance per unit length with a cosinusoidal function connected across said second source of voltage and a wiper moved in accordance with the elevation angle of said target to select a voltage approximately proportional to the vertical height of the target, means for indicating any inequality between the voltages selected by the wipers of said potentiometers, and means for adjusting the voltage from said second source to reduce said inequality to zero, whereby the voltage from said second source is made proportional to the slant range to said target.

DAVID B. PARKINSON.